United States Patent [19]

Bagga

[11] Patent Number: 5,021,513
[45] Date of Patent: Jun. 4, 1991

[54] CURABLE EPOXIDE RESIN COMPOSITIONS

[75] Inventor: Madan M. Bagga, Cambridge, England

[73] Assignee: Ciba-Geigy Corporation, Ardsley, N.Y.

[21] Appl. No.: 592,720

[22] Filed: Oct. 4, 1990

Related U.S. Application Data

[62] Division of Ser. No. 420,193, Oct. 12, 1989, Pat. No. 4,977,214.

[30] Foreign Application Priority Data

Oct. 18, 1988 [GB] United Kingdom ............... 8824391

[51] Int. Cl.$^5$ ............... C08F 12/24; C08G 59/68; C08G 8/28
[52] U.S. Cl. ............... 525/328.8; 524/252; 525/381; 525/504
[58] Field of Search ............... 525/328.8, 381, 504; 524/252

[56] References Cited

U.S. PATENT DOCUMENTS

| 4,659,779 | 4/1987 | Bagga et al. | 525/328.8 X |
| 4,701,378 | 10/1987 | Bagga et al. | 525/486 X |
| 4,709,009 | 11/1987 | Fujiwara et al. | 524/252 X |
| 4,866,133 | 9/1989 | Andrews et al. | 525/381 X |
| 4,970,264 | 11/1990 | Lindert et al. | 525/328.8 |

FOREIGN PATENT DOCUMENTS 60-173005 9/1985 Japan .

Primary Examiner—Earl Nielsen
Attorney, Agent, or Firm—JoAnn Villamizar

[57] ABSTRACT

Curable compositions comprise
(A) a polyglycidyl ether of a polyhydric phenol,
(B) a polyglycidyl ether of a polyhydric alcohol,
(C) a nitrogen-containing latent hardener for epoxide resins and
(D) as cure accelerator dispersed as a powder in the composition, a solid solution of a polymeric phenol with an aliphatic polyamine having two or more amine groups, each of the amine groups being tertiary and at least two of the amine groups being dimethylamino groups.

7 Claims, No Drawings

CURABLE EPOXIDE RESIN COMPOSITIONS

This is a divisional of application Ser. No. 420,193 filed on Oct. 12, 1989, now U.S. Pat. No. 4,977,214, issued Dec. 11, 1990.

This invention relates to curable compositions which can be used as adhesive, sealants, laminating resins and coatings.

The use of epoxide resins as adhesives and coatings has been commercial practice for several decades. Many hardeners are reactive at room temperature and so need to be mixed with the epoxide resin just prior to use. Others are stable in admixture with the epoxide resin at room temperature, and harden only when heated to elevated temperatures. These hardeners, the so-called 'latent hardeners' or 'latent curing agents', are available commercially and include a number of chemically different types, such as polycarboxylic acid hydrazides, aminotriazines, boron trifluoride complexes, boron trichloride-tertiary amine complexes, polyphenols, polycarboxylic acids, dicyandiamide, imidazoles, and organic metal compounds.

Compositions containing an epoxide resin and a latent hardener generally take 15 minutes to 1 hour to cure at temperatures of about 180° C. Cure times can be shortened by incorporation of latent accelerators which have little effect on storage stability at ambient temperatures but which enable gelation of the mixture to take place within about 30 minutes at 120° C. For instance, if dicyandiamide is used as the hardener, a substituted phenylurea, such as N-(4-chlorophenyl)-N',N'-dimethyl urea is often used as an accelerator. A more rapid gelation of such mixtures may be obtained by heating to a higher temperature but, at temperatures of around 200° C., this type of accelerator evolves volatiles which cause bubbling in the hardening mixture. The presence of such bubbles in a glue line is obviously a very serious drawback, since any bond so affected is much weaker than one formed with no bubbles. Similarly a bubbled mixture could not be used to prepare satisfactory coatings or laminates. It is therefore common practice to cure such mixtures at temperatures below about 150° C., at which temperature gelation takes about 5 minutes.

There is a desire in some sections of the automobile industry to replace spot welding of some components by adhesive bonding. In order to compete with welding, an adhesive is required that is capable of gelling within a few seconds at high temperature and which will give a cured product of high joint strength. In order to maintain production line speed it is essential that components to be joined are heated rapidly. Induction heating is a very rapid heating method, giving high temperatures within a few seconds. However, if such a heating method is used, fine control over the temperature is often difficult because of the geometry of the assembly. Accelerators that cause bubbling at high temperatures are therefore unsuitable.

Epoxide resins form bonds of very high strength, and would be suitable for the bonding of automobile components except that conventional formulations suffer from one or more of the following drawbacks: insufficient stability on ambient temperature storage, insufficient rapidity of hardening when heated, and formation of bubbles at high curing temperatures.

Curable epoxide resin compositions incorporating a nitrogen-containing latent hardener and, as accelerator, a solid solution of a nitrogen base having a boiling point above 130° C. and a polymer of an ethylenically unsaturated phenol are described in U.S. Pat. No. 4,659,779. Similar compositions in which the accelerator is a solid solution of a nitrogen base having a boiling point above 130° C. and a phenol-aldehyde resin are described in U.S. Pat. No. 4,701,378. The compositions described in the two U.S. patents are storage stable formulations which cure rapidly at temperatures of 180°-200° C. without formation of bubbles.

In compositions containing a polyglycidyl ether of a polyhydric phenol, it is often necessary to include a polyglycidyl ether of a polyhydric alcohol as a reactive diluent in order to achieve a composition of the required viscosity. It has been found particularly difficult to formulate latent storage stable compositions curing rapidly at elevated temperatures when the compositions contain a mixture of these different types of epoxide resin. We have now found that compositions containing such a mixture of epoxide resins and a nitrogen-containing latent hardener can be formulated to give rapid cure at elevated temperatures and excellent storage stability by including in such compositions, as accelerator, a solid solution of a polymeric phenol with a polyamine which is an aliphatic compound in which all the amine groups are tertiary and in which at least two of the amine groups are dimethylamino groups.

Accordingly, the present invention provides curable compositions comprising
 (A) a polyglycidyl ether of a polyhydric phenol,
 (B) a polyglycidyl ether of a polyhydric alcohol,
 (C) a nitrogen-containing latent hardener for epoxide resins and
 (D) as cure accelerator dispersed as a powder in the composition, a solid solution of a polymeric phenol with an aliphatic polyamine having two or more amino groups, each of the amino groups being tertiary and at least two of the amine groups being dimethylamino groups.

The term 'solid solution' as used with reference to component (D) is intended to indicate a combination of the polyamine and the polymeric phenol in a single solid phase. It is possible that there is some salt formation between the two components. It is also possible that there is hydrogen bonding between them. Such solid solutions are not usually made using stoichiometric quantities of the components and so they will usually contain one component in excess of the other. The term 'solid solution' covers all such products, whether containing salts of the polymeric phenol and the polyamine and whether containing an excess of either component.

Polyglycidyl ethers of polyhydric phenols contain, on average, more than one glycidyl ether group per molecule. Such polyglycidyl ethers suitable for use as component (A) of the compositions of the invention include polyglycidyl ethers of polynuclear phenols, for example bisphenols such as bis(4-hydroxyphenyl)methane (bisphenol F), 2,2-bis(4-hydroxyphenyl)propane (bisphenol A), 2,2-bis(3,5-dibromo-4-hydroxyphenyl)propane (tetrabromobisphenol A), 4,4'-dihydroxydiphenyl and bis(4-hydroxyphenyl)sulphone, tetranuclear polyhydric phenols such as 1,1,2,2-tetrakis(4-hydroxyphenyl)ethane and novolaks such as those formed from phenol or phenols substituted in the ring by chlorine atoms or by $C_1$-$C_9$ alkyl groups, e.g. 4-chlorophenol, 2-methylphenol or 4-tert.butylphenol, and aldehydes, e.g. acetaldehyde, chloral, furfuraldehyde and, particularly, formaldehyde. These polyglycidyl ethers may be prepared by reacting the polyhydric phenol with epichlorohydrin or glycerol dichlorohydrin under alkaline conditions or in the presence of an acidic catalyst followed by treatment with alkali.

Polyglycidyl ethers preferred for use as component (A) are liquids and include polyglycidyl ethers of bisphenol A and of phenol-formaldehyde novolaks.

Polyglycidyl ethers of polyhydric alcohols contain, on average, more than one glycidyl group per molecule. Such polyglycidyl ethers suitable for use as component (B) of the compositions of the invention include polyglycidyl ethers of acyclic alcohols such as ethylene glycol, diethylene glycol, and higher poly(oxyethylene)glycols, propane-1,2-diol and poly(oxypropylene) glycols, propane-1,3-diol, butane-1,4-diol, poly(oxytetramethylene) glycols, pentane-1,5-diol, hexane-1,6-diol, hexane-2,4,6-triol, glycerol, 1,1,1-trimethylolpropane, pentaerythritol, sorbitol, and polyepichlorohydrins; from cycloaliphatic alcohols such as resorcitol, quintol, bis(4-hydroxycyclohexyl)methane, 2,2-bis(4-hydroxycyclohexyl)propane, and 1,1,-bis(hydroxymethyl)cyclohex-3-ene; and from alcohols having aromatic nuclei, for example poly(N-hydroxyalkyl) derivatives of aromatic amines such as N,N-bis(2-hydroxyethyl)aniline, adducts of alkylene oxides with polyhydric phenols such as bis[p-(2-hydroxyethoxy)phenyl]methane and 2,2-bis[p-(2-hydroxyethoxy)phenyl]propane and alcohols of formula $$R^1OCH_2CH(OH)CH_2O-R-OCH_2CH(OH)CH_2OR^1 \qquad I$$

where
R denotes a phenylene group or a radical consisting of two or three phenylene groups linked by one or two carbon-carbon bonds, ether oxygen atoms, sulphur atoms, sulphonyl groups, sulphoxide groups, carbonyl groups or alkylene groups of 1 to 5 carbon atoms, each phenylene group optionally being substituted by one or two $C_1$–$C_4$ alkyl groups or by one or two chlorine or bromine atoms, and
$R^1$ denotes $C_1$–$C_{16}$ alkyl, optionally substituted by chlorine or bromine; $C_2$–$C_6$ alkenyl, optionally substituted by chlorine or bromine; phenyl or phenylalkyl, optionally substituted in the ring by one or two chlorine or bromine atoms or by one or two $C_1$–$C_4$ alkyl groups; $C_3$–$C_6$ cycloalkyl; or $C_4$–$C_{10}$ cycloalkylalkyl.

Alcohols of formula I, such as 2,2-bis(p-(3-ethoxy-2-hydroxypropyloxy)phenyl)propane, 2,2-bis(p-(3-butoxy-2-hydroxypropyloxy)phenyl)propane, and bis(p-(3-butoxy-2-hydroxypropyloxy)phenyl)sulphone, and their preparation are described in U.S. Pat. No. 4,284,574.

The polyglycidyl ethers of the polyhydric alcohols may be prepared in a conventional manner by reacting the polyhydric alcohol with epichlorohydrin or glycerol dichlorohydrin under alkaline conditions or in the presence of an acidic catalyst followed by treatment with alkali.

Preferred polyglycidyl ethers of polyhydric alcohols include those of acyclic alcohols, preferably of butane-1,4-diol, hexane-1,6-diol, poly(oxyethylene)glycols, poly(oxypropylene) glycols and of alcohols having an aromatic nucleus, preferably those of formula I where R denotes a radical consisting of two phenylene groups linked by an alkylene group of 1 to 3 carbon atoms and $R^1$ denotes an alkyl group of 1 to 8 carbon atoms. Particularly preferred such polyglycidyl ethers are those of butane-1,4-diol and 2,2-bis(p-(3-butoxy-2-hydroxypropyloxy)phenyl)propane.

The nitrogen-containing latent hardener (C) used in the curable compositions may be any substance that remains inert towards epoxide resins below a certain 'threshold' temperature, which is usually at least 80° C., and preferably 100° C. or above, but reacts rapidly to effect curing once that threshold temperature has been exceeded. Such materials are well known and commercially available and include boron trichloride/amine and boron trifluoride/amine complexes, dicyandiamide, melamines, guanamines such as acetoguanamine and benzoguanamine, aminotriazoles such as 3-amino-1,2,4-triazole, and polycarboxylic acid hydrazides including dihydrazides of aliphatic or aromatic dicarboxylic acids such as adipic dihydrazide, stearic dihydrazide, and isophthalic dihydrazide. Dicyandiamide and the hydrazides are preferred, the use of dicyandiamide, isophthalic acid dihydrazide and adipic acid dihydrazide being particularly preferred.

The solid solution (D) used as accelerator in the curable compositions is prepared and powdered prior to admixture with the resins (A) and (B) and curing agent (C). If the solid solution (D) is not prepared prior to admixture with the resins and curing agent, but an attempt is made to prepare it in situ in the epoxy resins, a storage stable mixture is not obtained.

The polymeric phenol from which the solution (D) is prepared generally has, on average, more than two repeating units per molecule each having at least one phenolic hydroxyl group. Preferred such polymers are polymers, which may be homopolymers of, ethylenically unsaturated phenols and phenolic novolak resins.

As examples of polymers of ethylenically unsaturated phenols there may be mentioned homopolymers of allyl-substituted phenols, such as 2-allylphenol and 4-allylphenol; homopolymers of phenols having substituents containing acrylic unsaturation, for example phenols which are reaction products of an acid halide of a phenolic hydroxyl group-containing carboxylic acid such as salicyclic acid or p-hydroxybenzoic acid with a hydroxyalkyl acrylate or methacrylate such as 2-hydroxyethyl methacrylate; homopolymers of vinyl- or 1-propenyl-substituted phenols such as o-vinylphenol, m-vinylphenol, p-vinylphenol and halogenated derivatives thereof, and o-(1-propenyl)phenol, m-(1-propenyl)phenol, p-(1-propenyl) and halogenated derivatives thereof, copolymers of any of the abovementioned phenols with at least one other polymerisable ethylenically unsaturated material, for example a styrene such as styrene itself, alphamethylstyrene, 4-bromostyrene and 4-methylstyrene, an acrylic ester such as an alkyl acrylate or methacrylate or a hydroxyalkyl acrylate or methacrylate, or a vinyl ester such as vinyl acetate; and mixtures of two or more of the abovementioned homopolymers and/or copolymers. The addition homopolymers and copolymers of unsaturated phenols can be prepared using conventional polymerisation techniques, either from the unsaturated phenols themselves or from their esters or ethers. When the esters or ethers are used, the resulting polymers can be hydrolysed to convert the ester or ether groups to free phenolic hydroxyl groups.

Preferred polymers of ethylenically unsaturated phenols are polymers of a vinylphenol having a weight average molecular weight of at least 1500. Especially preferred such vinylphenol polymers are homopolymers having repeating units of formula

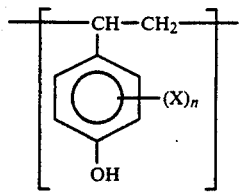

$$\mathrm{II}$$

where X denotes a halogen atom and n denotes zero or 1, and copolymers having units of formula II together with units derived from at least one other vinyl monomer, preferably styrene or an alkyl or hydroxyalkyl acrylate or methacrylate such as methyl methacrylate or 2-hydroxyethyl methacrylate, the polymers having a weight average molecular weight of 1500 to 50,000, particularly 2000 to 30,000.

Suitable phenolic novolak resins are those prepared from a mononuclear phenol, including phenol itself and alkyl-substituted mononuclear phenols, and an aldehyde such as acetaldehyde, benzaldehyde, furfuraldehyde or, preferably, formaldehyde. Preferred novolaks derived from mononuclear phenols are phenol-formaldehyde novolak resins, preferably those prepared using a phenol: formaldehyde molar ratio of from 1:0.5 to 1:1, especially from 1:0.8 to 1:0.95, and phenol-p-tert.butyl-phenol-formaldehyde novolak resins, preferably those prepared using a phenol: p-tert.butylphenol: formaldehyde molar ratio within the range 0.6–1.9:0.1–0.4:1, the molar ratio of combined phenolic compounds to formaldehyde being from 1:1 to 2:1.

Other suitable phenolic novolak resins are those prepared from a polynuclear phenol, particularly a bisphenol, and an aldehyde such as acetaldehyde, benzaldehyde, furfuraldehyde or, preferably, formaldehyde. Bisphenols from which such resins may be derived include bis(4-hydroxyphenyl)methane, 4,4'-dihydroxydiphenyl, bis(4-hydroxyphenyl)sulphone, 4,4'-dihydroxybenzophenone and, preferably, 2,2-bis(4-hydroxyphenyl)propane (bisphenol A). Preferred bisphenol-aldehyde novolak resins are bisphenol A-formaldehyde resins, particularly those prepared using a bisphenol A: formaldehyde molar ratio of from 1:0.4 to 1:0.5.

The aliphatic polyamine from which the solid solution (D) is prepared, which polyamine has at least two dimethylamino groups, preferably has all amino nitrogen atoms present as methyl-substituted nitrogen atoms. Thus in addition to the at least two terminal dimethylamino groups, any amino nitrogen atoms in the chain are preferably methyl-substituted. Preferred such aliphatic polyamines include N,N,N',N'-tetramethylalkylenediamines such as N,N,N',N'-tetramethylethylenediamine and N,N,N',N'-tetramethyl-1,3-propylenediamine. Particularly preferred such aliphatic polyamines are polyalkylenepolyamines having terminal dimethylamino groups and one or more methyl-substituted amino nitrogen atoms in the chain thereof, such as N,N,N',N'',N''-pentamethyldiethylenetriamine, N,N,N',N'',N''-pentamethyldipropylenetriamine, N,N,N',N'',N''',N'''-hexamethyltriethylenetetramine, N,N,N',N'',N''', N'''-hexamethyltripropylenetetramine, N,N,N',N'',N''', N'''', N''''-heptamethyltetraethylenepentamine, and N,N,N',N'',N''', N'''', N''''-heptamethyltetrapropylenepentamine and fully methylated derivatives of N-(3-aminopropyl)ethylenediamine, N,N'-bis(3-aminopropyl)ethylenediamine, N,N'-bis(2-aminoethyl)-1,3-propylenediamine, pentaethylenehexamine and pentapropylenehexamine. The use of solid solutions (D) derived from these substituted polyalkylenepolyamines, which solid solutions are believed to be novel, has been found to give curable compositions of the invention having a remarkable combination of very long storage life and very rapid curability at temperatures from about 140° C. upwards.

Aliphatic polyamines of the types described above are either commercially available or may be readily prepared from commercially available polyamines by conventional methylation reactions, for example by reaction with formaldehyde and formic acid under reflux.

The solution (D) may be prepared simply by heating the polymeric phenol and the aliphatic polyamine together until a clear liquid is obtained and then cooling to form a solid product. Alternatively, the polymeric phenol may be dissolved in a lower alcohol, usually methanol, ethanol or isopropanol, or a hydrocarbon such as toluene, at ambient or moderately elevated temperature, and the polyamine, which may also be in solution in such a solvent, added gradually to the resulting solution. The solvent can then be evaporated to give the solid solution. Usually no further purification is necessary. The weight ratio of polymeric phenol to aliphatic polyamine is chosen to give a solid, stable product and is generally within the range 0.5:1 to 5:1, preferably within the range 1:1 to 4:1.

Generally the solid solution is ground to a fine powder, that is a powder having a particle size finer than 100 mesh (0.15 mm), for example about 200 mesh (0.07 mm), before being mixed with other components of the curable composition. Coarser particles of the solid solution can usually be included in the composition since mixing of the components of the composition may be conveniently carried out using conventional mixing equipment such as roll mills, which mixing can effect a reduction in the particle size.

In the curable compositions of the invention, the alcoholic glycidyl ether (B) is generally used in an amount of 5 to 75%, preferably 5 to 50%, particularly 10 to 40%, by weight of the phenolic polyglycidyl ether (A). The amount of latent hardener (C) may be the amount used conventionally for the particular hardener and epoxide resins. Such amounts are well known by those familiar with the formulation of curable epoxide resin compositions. As a guide, the amount of hardener is generally within the range of 1 to 30 parts by weight per 100 parts by weight of the mixture of the glycidyl ethers (A) and (B). When (C) is dicyandiamide, the amount is preferably within the range of 3 to 20, especially 5 to 10, parts by weight per 100 parts by weight of the mixture of (A) and (B). When (C) is a hydrazide of a polycarboxylic acid, the amount is preferably such as to provide from 0.5 to 1.5, especially 0.8 to 1.2, active amino-hydrogen equivalents per epoxide equivalent of the mixture of (A) and (B). The amount of the solid solution (D) is not critical, provided an effective amount is present to give an accelerating effect. Generally amounts of (D) within the range of 0.1 to 20%, preferably 0.1 to 10%, and especially 0.5 to 5%, by weight of the mixture of (A) and (B) are used.

The compositions of the invention may contain additives such as those conventionally incorporated in epoxide resin compositions in order to improve their physical or chemical properties in the cured or uncured state including, for example, pigments, dyes, flexibilisers, plasticisers, fillers, thixotropic agents and fire retardants. Suitable polymeric materials which can be added as toughening agents include acrylic esters of epoxide resins, polyurethane prepolymers, blocked polyisocyanates and elastomeric butadiene polymers. Curable liquid compositions of the invention may vary from unfilled compositions of low viscosity to pastes or putties which can contain large amounts of fillers or other additives. Compositions of the invention may also be in the form of films or sheets, which may be fibre-reinforced and may be supported on a carrier such as a glass fibre fabric.

Compositions of the invention can be cured by heating at elevated temperatures, generally from 120° to 220° C., preferably from 140° to 210° C., especially from 160° to 200° C. Cure can be effected in less than one minute, particularly at the higher temperatures within these ranges, but the heating can be continued, for example for up to 3 hours, to improve the physical properties of the cured product. When rapid heating is required, for example in the bonding or sealing of automobile components, this is conveniently achieved by the use of induction heating.

The curable compositions may be used as coating, casting or laminating resins or, more particularly, as adhesives or sealants. The invention also provides a method of bonding or sealing two surfaces together which comprises applying a composition of the invention to one or both surfaces, placing the two surfaces together with the composition positioned therebetween and heating the resulting assembly until the composition is cured. This method may be used with surfaces of metal, such as steel or aluminium, plastic materials, glass, friction materials such as brake linings, and ceramic materials. It is particularly useful when both surfaces are of metal.

The invention is illustrated by the following Examples, in which parts and percentages are by weight unless otherwise indicated.

The accelerators used in the Examples are prepared as follows:

ACCELERATOR I

A novolak prepared from phenol and formaldehyde in the molar ratio 1:0.85 and melting in the range 70°–90° C. (7 g) is mixed with N,N,N',N'-tetramethylethylenediamine (2 g) and heated slowly to 120° C. It is kept at this temperature for 30 minutes, then poured into an aluminium tray, allowed to cool, and the resultant brittle solid is ground to a powder.

ACCELERATOR II

A novolak prepared from phenol and formaldehyde in the molar ratio 1:0.85 and melting in the range 70°–90° C. (7 g) is mixed with N,N,N',N'-tetramethylpropylenediamine (2 g) and heated slowly to 130° C. It is kept at this temperature for 30 minutes then poured into an aluminium tray, allowed to cool, and the resultant brittle solid is ground to a powder.

ACCELERATOR III

A novolak prepared from phenol and formaldehyde in the molar ratio 1:0.85 and melting in the range 70°–90° C. (9.2 g) is melted at 140° C. and N,N,N',N'',N''',N'''-hexamethyltriethylenetetramine (4 g) is added dropwise with stirring. The temperature of the reaction mixture is held at 140° C. for 30 minutes. The resulting clear melt is then poured into an aluminium tray where it solidifies to a solid which is ground to a fine powder.

ACCELERATOR IV

A novolak prepared from phenol and formaldehyde in the molar ratio 1:0.85 and melting in the range 70°–90° C. (9.2 g) is mixed with N,N,N',N'',N''-pentamethyldipropylenetriamine (4 g) and heated slowly to 140° C. The mixture is held at this temperature for 30 minutes. The clear melt obtained is poured into an aluminium tray where it solidifies on cooling. The resulting solid is ground to a fine powder.

ACCELERATOR V

A novolak prepared from phenol and formaldehyde in the molar ratio 1:0.85 and melting in the range 70°–90° C. (10 g) is melted at 140° C. and N,N,N',N'',N''-pentamethyldiethylenetriamine (5 g) is added dropwise with stirring. The temperature of the reaction mixture is raised to 150° C. and the clear melt so obtained is held at 150° C. for 30 minutes. The melt is then poured out into an aluminium tray where it solidifies on cooling. The resulting solid is ground to a fine powder.

ACCELERATOR VI

A novolak prepared from phenol and formaldehyde in the molar ratio 1:0.57 and melting in the range 68°–78° C. (12 g) is dissolved in methanol (20 g) at ambient temperature and N,N,N',N'',N''-pentamethyldiethylenetriamine (5.4 g) is added with stirring. The mixture is stirred for a further 30 minutes, then methanol is removed by distillation at atmospheric pressure, the temperature in the reaction vessel being allowed to rise to 150° C. Last traces of methanol are removed under a pressure of 400 mm Hg at 150° C. The mixture is held for a further 30 minutes at 150° C. and then poured into an aluminium tray where it solidifies on cooling. The solid obtained is ground to a fine powder.

ACCELERATOR VII

A novolak prepared from phenol and formaldehyde in the molar ratio 1:0.89 and melting in the range 85°–100° C. (10 g) is melted at 160° C. and N,N,N',N'',N''-pentamethyldiethylenetriamine (5 g) is added dropwise with stirring. The reaction mixture is stirred for a further 30 minutes at 160° C., then the temperature is raised to 170° C. and held for 45 minutes under a pressure of 300 mm Hg. The melt obtained is poured into an aluminium tray where it solidifies on cooling. The resulting solid is ground to a fine powder.

ACCELERATOR VIII

A novolak prepared from bisphenol A and formaldehyde in the molar ratio 1:0.46 and melting at 90° C. (10.5 g) is melted at 150° C. and N,N,N',N'',N''-pentamethyldiethylenetriamine (3 g) is added dropwise with stirring. The reaction mixture is stirred for a further 30 minutes at 150° C. and held at this temperature for a further 30 minutes under a pressure of 400 mm Hg. The resulting melt is poured into an aluminium tray where it solidifies on cooling. The solid obtained is ground to a fine powder.

ACCELERATOR IX

A poly(p-vinylphenol) having a weight average molecular weight of 10,000 and available from Maruzen Petrochemical KK, Tokyo, Japan under the designation "Maruka Lyncur-M Grade S-4" (12 g) is dissolved in methanol (20 g) at ambient temperature. To the solution is added N,N,N',N",N"-pentamethyldiethylenetriamine (6 g) with stirring. Methanol is removed by distillation at atmospheric pressure, the temperature of the mixture being allowed to rise to 150° C. Last traces of methanol are removed under a pressure of 400 mm Hg at 150° C. for one hour. The resulting mixture is poured into an aluminium tray and allowed to cool. The solid obtained on cooling is ground to a fine powder.

ACCELERATOR X

A novolak prepared from phenol (0.8 mol) p-tert-.butylphenol (0.3 mol) and formaldehyde (1 mol) and melting at 115° C. (6 g) is mixed with N,N,N',N",N"-pentamethyldiethylenetriamine (3 g). The mixture is heated slowly to 140° C. and maintained at this temperature for one hour. The clear melt obtained is poured into an aluminium tray, where it solidifies on cooling. The resulting solid is ground to a fine powder.

EXAMPLES 1-9

Curable paste compositions are prepared by dispersing powdered dicyandiamide (8 parts) as hardener and one of Accelerators I to IX (2 parts), together with highly dispersed silica (4 parts) as filler, in a mixture of a diglycidyl ether of bisphenol A having an epoxide content of 5.2 equivs./kg (80 parts) and a diglycidyl ether of butane-1,4-diol having an epoxide content of 8.8 equivs./kg (20 parts). The gelation times of the compositions at particular temperatures are measured by placing a sample on a surface maintained at the test temperature and observing the time taken for gelation to occur. The storage lives of the compositions are determined by storing them in tubes in a fanned oven at 40° C., the end of the storage life being taken to be the time when the composition can no longer be spread at ambient temperature.

The nature of the accelerator in the compositions, together with the gel times and storage lives of the compositions, are given in Table 1.

TABLE 1

| Ex. | Accelerator | Gel Time (min) 140° C. | 180° C. | Storage Life |
|---|---|---|---|---|
| 1 | I | 9.5 | 1.0 | More than 16 weeks |
| 2 | II | 11.3 | 0.8 | More than 16 weeks |
| 3 | III | 12.8 | 0.8 | More than 13 weeks |
| 4 | IV | 11.0 | 0.7 | More than 8 weeks |
| 5 | V | 12.5 | 0.8 | More than 12 weeks |
| 6 | VI | 6.5 | 0.7 | More than 4 weeks |
| 7 | VII | 14.5 | 1.2 | More than 12 weeks |
| 8 | VIII | 11.5 | 0.8 | More than 6 weeks |
| 9 | IX | 14.5 | 1.2 | More than 12 weeks |

EXAMPLE 10

A composition is prepared containing

| bisphenol A diglycidyl ether | 80 parts |
|---|---|
| butane-1,4-diol diglycidyl ether | 20 parts |
| dicyandiamide | 8 parts |
| highly dispersed silica | 5 parts |
| glass microspheres | 1 part |
| Accelerator I | 2 parts |

The diglycidyl ethers are the same as those used in Examples 1 to 9. The glass microspheres are incorporated to control glue line thickness.

This composition is applied to degreased, shot-blasted mild steel plates and lap joints are prepared having an overlap area of 645 mm$^2$. Cure is effected at 180° C. for 15 minutes, after which the joints are allowed to cool to room temperature. The lap shear strength (average of 3 replicates), measured at a pulling rate of 7.5 mm/min, is 16.8 MPa.

EXAMPLE 11

Example 10 is repeated, replacing the accelerator used in that Example by Accelerator III. The average lap shear strength obtained is 17.0 MPa.

EXAMPLE 12

Example 10 is repeated, replacing the accelerator used in that Example by Accelerator IV. The average lap shear strength obtained is 17.0 MPa.

EXAMPLE 13

Example 10 is repeated replacing the accelerator used in that Example by Accelerator V. The average lap shear strength obtained is 16.9 MPa.

EXAMPLE 14

The procedure of Examples 1-9 is repeated, replacing the accelerators used in those Examples by Accelerator X. The composition had gel times at 140° C. and 180° C. of 6.2 minutes and 0.6 minute respectively, and had a storage life at 40° C. of more than 10 weeks.

What is claimed is:

1. An epoxy resin cure accelerator comprising a solid solution of a polymeric phenol with an aliphatic polyamine having two or more amine groups, each of the amine groups being tertiary and at least two of the amine groups being dimethylamino groups.

2. An accelerator according to claim 1 which is a solid solution of a polymeric phenol with a polyalkyl-enepolyamine having terminal dimethylamino groups and one or more methyl-substituted amino nitrogen atoms in the chain thereof.

3. An accelerator according to claim 2, in which the polymeric phenol has, on average, more than two repeating units per molecule each having at least one phenolic hydroxyl group.

4. An accelerator according to claim 3, in which the polymeric phenol is a polymer of an ethylenically unsaturated phenol or a phenolic novolak resin.

5. An accelerator according to claim 4, in which the polymeric phenol is a polymer of a vinylphenol having a weight average molecular weight of at least 1500, a phenol-formaldehyde novolak resin, a phenol-p-tert-.butylphenol-formaldehyde novolak resin, or a bisphenol A-formaldehyde novolak resin.

6. An accelerator according to claim 5, in which the polymeric phenol is
a homopolymer having repeating units of formula

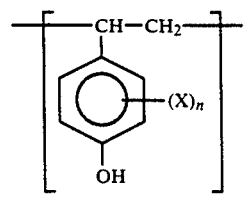

II where X denotes a halogen atom and n denotes zero or 1, or a copolymer having units of formula II, together with units derived from at least one other vinyl monomer, the polymeric phenol having a weight average molecular weight of 1500 to 50,000, or a phenol-formaldehyde novolak resin prepared using a phenol:formaldehyde molar ratio of from 1:0.5 to 1:1, or a phenol-p-tert.butylphenol-formaldehyde novolak resin prepared using a phenol:p-tert.butylphenol:formaldehyde molar ratio within the range 0.6–1.9:0.1–0.4:1, the molar ratio of combined phenolic compounds to formaldehyde being from 1:1 to 2:1, or a bisphenol A-formaldehyde novolak resin prepared using a bisphenol A:formaldehyde molar ratio of from 1:0.4 to 1:0.5.

7. An accelerator according to claim 2, in which the weight ratio of polymeric phenol to aliphatic polyamine is within the range 0.5:1 to 5:1.

* * * * *